Aug. 14, 1962 M. A. ROBERTI ETAL 3,049,660
PHASE SHIFT CONTROL NETWORK
Filed Aug. 29, 1960

INVENTORS
MICHAEL A. ROBERTI
RALPH A. WALTER
BY
ATTORNEY

United States Patent Office 3,049,660
Patented Aug. 14, 1962

3,049,660
PHASE SHIFT CONTROL NETWORK
Michael Albert Roberti, Clark, and Ralph Alben Walter, Fanwood, N.J., assignors to The Bendix Corporation, Eatontown, N.J., a corporation of Delaware
Filed Aug. 29, 1960, Ser. No. 52,704
3 Claims. (Cl. 323—111)

The present invention relates to control circuits and more particularly to a phase shift control network.

In multiphase static inverters it is necessary to provide means to maintain the phases in proper relationship. Various phase shifting devices have been employed, however, they do not provide a continuous and controllable rate.

The present invention provides a phase shift control circuit to phase shift a square wave from 0° to 180°. A reference square wave is applied to a pulse width self-saturable type of magnetic modulator. The width of the square wave is controlled by a D.C. signal applied to a control winding of the modulator. Further means are provided to add a pulse width to the trailing edge of both the positive and negative pulses of the modulator output such that the sum of the modulator output and the added pulse width will equal the width of the reference square wave.

It is an object of the invention to provide a novel phase shift control circuit.

Another object of the invention is to provide means to phase shift a square wave from 0° to 180°.

Another object is to provide an improved phase shift circuit for a square wave in which the output square wave is of the same width as the reference square wave.

Another object of the invention is to provide a phase shift circuit that is continuously controllable.

The above and other objects and features of the invention will appear more fully hereinafter from a consideration of the following description taken in connection with the accompanying drawing wherein one embodiment is illustrated by way of example.

Figure 1:
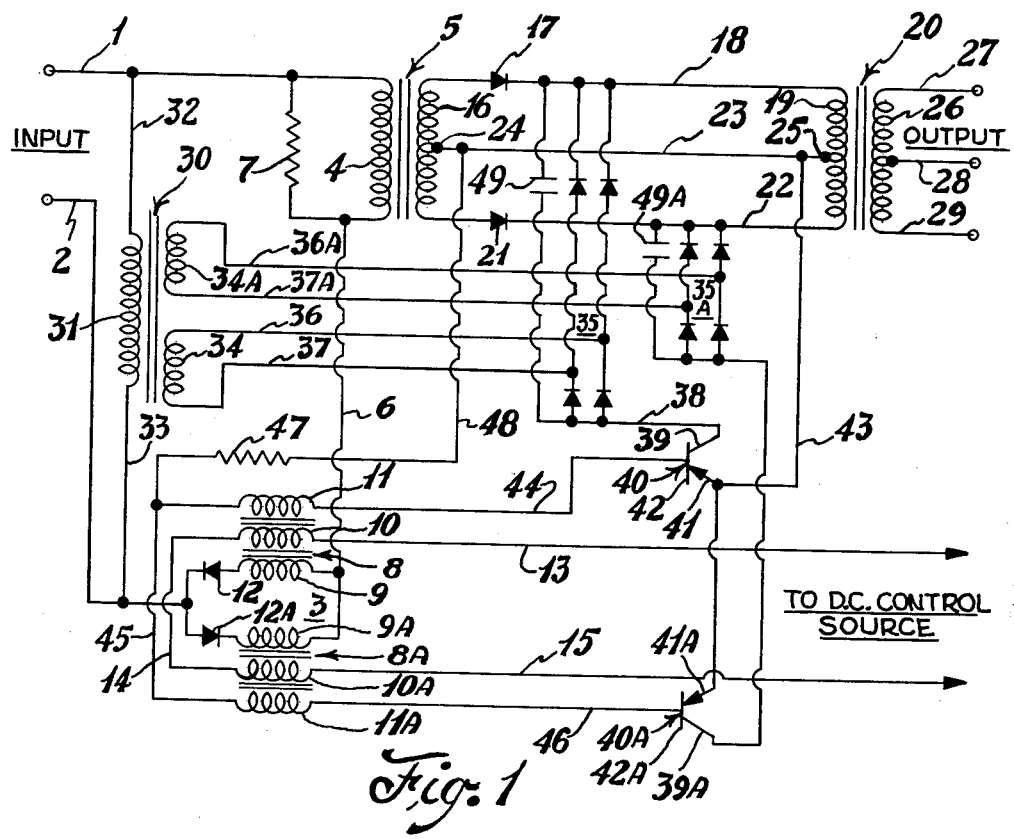
FIGURE 1 is a schematic diagram of a circuit embodying the invention.
Figure 2:
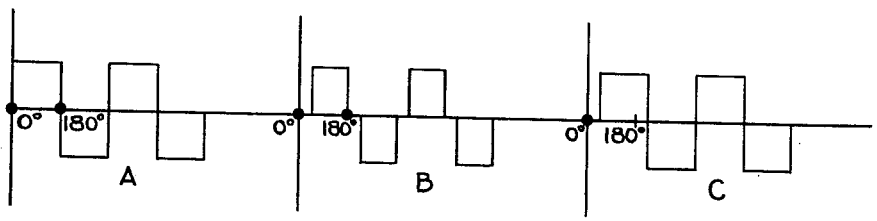
FIGURE 2 is a graph illustrating the invention.

Referring now to the drawing, a reference square wave, such as shown in FIGURE 2A, is applied to input conductors 1 and 2. The square wave may be from an oscillator or other suitable source. A magnetic modulator 3 is connected in series with primary winding 4 of a transformer 5 by conductor 6 across the input conductor 1 and 2. A load resistor 7 may be connected across the winding 4. The modulator 3 comprises reactors 8 and 8A which have load windings 9 and 9A, control windings 10 and 10A and special windings 11 and 11A. One end of the windings 9 and 9A are connected to the conductor 6. The other end of the windings 9 and 9A are connected by diodes 12 and 12A to the conductor 2. The windings 10 and 10A are connected in series by conductors 13, 14 and 15 across a source of D.C. control voltage (not shown). The control voltage may be an error signal such, for example, as a deviation from a predetermined phase relationship.

The transformer 5 has a secondary winding 16, one side of which is connected by diode 17 and conductor 18 to one side of primary winding 19 of an output transformer 20. The other side of the winding 16 is connected by diode 21 and conductor 22 to the other side of the winding 19. Conductor 23 connects a center tap 24 on the winding 16 to a center tap 25 on the winding 19. The transformer 20 has a secondary 26 winding which may be connected to a suitable load by conductors 27, 28 and 29.

With the circuit as heretofore set forth, a reference square wave, as illustrated in FIGURE 2A, is applied to the pulse width modulator 3. The width of the square wave is controlled by a D.C. signal applied to the control windings 10 and 10A. Thus, the angle of conduction or pulse width may be varied in accordance with the control signal applied to the modulator 3. FIGURE 2B illustrates the wave form of the output from the modulator 3 for a given control signal.

A feature of the invention is the means to add a pulse width to the trailing edge of both the positive and negative pulses of the modulator output so that the sum of the modulator output and the added pulse width will equal the width of the reference square wave.

The added pulse width is obtained from a source of D.C. and, for the purpose of illustration, is obtained from the reference square wave. It is understood, however, that it could be obtained from any suitable D.C. source. A transformer 30 has a primary winding 31 connected across conductors 1 and 2 by conductors 32 and 33. The transformer 30 has secondary windings 34 and 34A connected to the input of bridge rectifiers 35 and 35A by conductors 36, 37 and 36A, 37A respectively. One side of the output of the rectifier 35 is connected to the conductor 18 and one side of the output of the rectifier 35A is connected to the conductor 22. The other side of the output of the rectifier 35 is connected by conductor 38 to collector 39 of a transistor 40 and the other side of the output of the rectifier 35A is connected by conductor 38A to collector 39A of a transistor 40A. The transistors 40 and 40A also have an emitter 41 and 41A and base 42 and 42A. The emitters 41 and 41A are connected by a conductor 43 to the conductor 23. The base 42 of the transistor 40 is connected by conductor 44 to one end of the winding 11 of the reactor 8. The other end of the winding 11 is connected by conductor 45 to one end of the winding 11A of the reactor 8A and the other end of the winding 11A is connected by conductor 46 to the base 42A of the transistor 40A. A resistor 47 is connected by conductor 48 between the conductors 45 and 23 to provide an adjustment for proper transistor drive. Capacitors 49 and 49A may be connected across the respective rectifiers 35 and 35A.

In operation a reference square wave is applied to the pulse width self-saturable type magnetic modulator 3. The width of the square wave is controlled by a D.C. signal applied to the windings 10 and 10A. Thus the pulse width or angle of conduction may be varied in accordance with the D.C. signal as illustrated in FIGURE 2B for a given control signal. In order to add a pulse width to the trailing edge of both the positive and negative pulses of the modulator output, the reactors 8 and 8A are provided with the windings 11 and 11A.

The voltage across the reactors of the magnetic modulator is equal to the difference between the reference square wave and the modulator output. By transformer action this voltage develops a drive signal in the windings 11 and 11A that is applied to the base of the transistors 40 and 40A causing them to conduct and add the proper pulse width to the trailing edges of the modulator output pulses. Thus a square wave output is obtained that is of the same width as the reference square wave but the phase has been shifted in accordance with a control signal.

While the power for the added pulse has been illustrated as being from the reference square wave, any other suitable D.C. source connected in series with the transistors could be used. Further, the transformers 5 and 20 could be replaced with center tapped resistors. Utilizing center tapped resistors would enable the resistor 7 to be eliminated inasmuch as the modulator would not be working into a reactive load.

Although only one embodiment of the invention has been illustrated and described, various changes in the form and relative arrangement of the parts, which will now appear to those skilled in the art, may be made without departing from the scope of the invention.

What is claimed is:

1. A phase shift control circuit comprising a magnetic modulator, a reference square wave connected to the input of said modulator, a control signal connected to vary the output of said modulator in accordance with said control signal, a source of D.C., and means responsive to the voltage drop across said modulator to connect said D.C. source to said output to add a pulse width to the trailing edge of said modulator output pulse.

2. A phase shift control circuit comprising a magnetic modulator, said modulator having a load winding, a control winding, and a third winding, means for applying a reference square wave to said load winding, means for applying a control signal to said control winding for controlling the output of said load winding in accordance with said control signal, a source of direct current, and means including said third winding for connecting said source of direct current to the output of said modulator to add to said output in accordance with the voltage drop across said modulator.

3. A phase shift network comprising a reference square wave, a magnetic modulator, circuit means connecting said square wave across said modulator, control windings for said modulator responsive to a signal to vary the output of said modulator in accordance with said signal to produce a square wave shifted in phase relationship relative to said reference square wave and having a pulse width reduced by the amount of phase shift thereof, and means including a pair of transistors responsive to the voltage drop across said modulator to add a pulse width to the trailing edge of said output pulse to restore the reduced pulse width to that of the reference square wave.

References Cited in the file of this patent
UNITED STATES PATENTS 2,813,247    Decker _____ Nov. 12, 1957